United States Patent [19]
Deering

[11] Patent Number: 5,584,655
[45] Date of Patent: Dec. 17, 1996

[54] ROTOR DEVICE AND CONTROL FOR WIND TURBINE

[75] Inventor: Kenneth J. Deering, Seattle, Wash.

[73] Assignee: The Wind Turbine Company, Bellevue, Wash.

[21] Appl. No.: 360,310

[22] Filed: Dec. 21, 1994

[51] Int. Cl.⁶ .............................. F03D 1/00; F03D 7/04
[52] U.S. Cl. .............................. 416/31; 416/11; 416/41; 416/156; 290/44
[58] Field of Search .............................. 416/10, 11, 31, 416/41, 48, 156, DIG. 4, 9; 290/44

[56] References Cited

U.S. PATENT DOCUMENTS

| | | |
|---|---|---|
| 2,484,291 | 10/1949 | Hays . |
| 4,081,220 | 3/1978 | Andrews . |
| 4,161,658 | 7/1979 | Patrick ........................... 416/48 |
| 4,201,514 | 5/1980 | Huetter . |
| 4,236,083 | 11/1980 | Kenney . |
| 4,247,258 | 1/1981 | Griffee, Jr. et al. . |
| 4,335,996 | 6/1982 | Ross ................................ 416/9 |
| 4,348,156 | 9/1982 | Andrews . |
| 4,366,387 | 12/1982 | Carter, Jr. et al. . |
| 4,423,333 | 12/1983 | Rossman . |
| 4,435,646 | 3/1984 | Coleman et al. . |
| 4,447,738 | 5/1984 | Allison . |
| 4,449,889 | 5/1984 | Belden . |
| 4,495,423 | 1/1985 | Rogers . |
| 4,522,564 | 6/1985 | Carter, Jr. et al. . |
| 4,565,929 | 1/1986 | Baskin et al. . |
| 4,584,486 | 4/1986 | Quynn ............................. 290/44 |
| 4,769,959 | 9/1988 | Lindsey . |
| 5,315,159 | 5/1994 | Gribnau . |
| 5,354,175 | 10/1994 | Coleman et al. ................ 416/9 |

FOREIGN PATENT DOCUMENTS 811726  4/1937  France .

OTHER PUBLICATIONS

Fay, *The Helicopter History, Piloting & How It Flies*, David & Charles Publishers, Hippocrene Books, Inc. 1987, pp. 49–50, 103–105.
Hagg et al., "Design of Flexteeter", IEA Wind R & D EC Meeting, Oct. 1991.
Hagg et al., "The Results of the Dutch Flexhat Programme: The Technology for the Next Generation of Wind Turbines", Proceedings of Wind Power '93, AWEA Jul. 12–16, 1993, pp. 331–341.
Jamieson et al., "Advanced Wind Turbine Design", Proceedings of the 16th British Wind Energy Association Conference, Jun. 15–17, 1994, pp. 41–46.
Jamieson et al., "Advanced Wind Turbine Design", SED. vol. 16, Wind Energy 1995, ASME 1995, pp. 23–30.
van Kuik et al., "The Flexhat Program, Technology Development and Testing of Flexible Rotor Systems With Fast Passive Pitch Control", Proceedings of EWEC 1991, pp. 836–842.
"Rexroth Worldwide Pneumatics", The Rexroth Corporation, Mar. 1992.

*Primary Examiner*—F. Daniel Lopez
*Assistant Examiner*—Christopher Verdier
*Attorney, Agent, or Firm*—Bogle & Gates, P.L.L.C.

[57] ABSTRACT

A wine turbine with blades having a high lift-to-drag ratio is provided. A hydraulic or other control system is used to control cone angle, such as in response to flap moment. Pitch of blades is controlled, such as in relation to the blade flap angle. Teeter motion is controlled preferably as a function of teeter angular velocity.

14 Claims, 7 Drawing Sheets

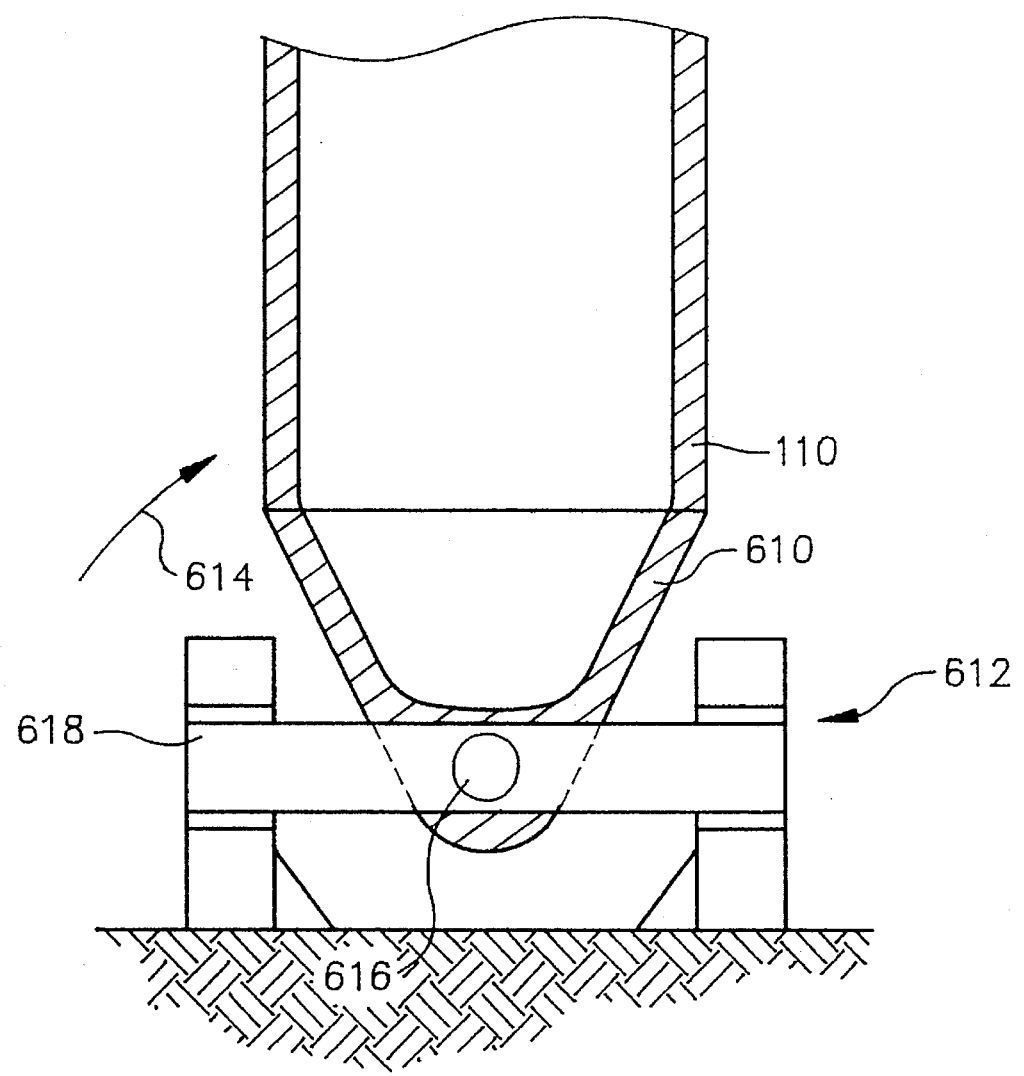

ROTOR DEVICE AND CONTROL FOR WIND TURBINE

The present invention is directed to a wind turbine and particularly to a device and method for controlling the rotor and rotor blades of the wind turbine.

BACKGROUND INFORMATION

Many attempts have been made to derive useful energy from the wind. In general, design has progressed to the point that, on a per-energy-unit cost basis, wind turbine energy costs approach those of conventional power sources. Because of the size of worldwide power needs, even small incremental changes in wind turbine efficiency can provide substantial benefits.

One of the factors influencing the efficiency of a wind turbine is the lift-to-drag ratio of the blades. The lift-to-drag ratio can be improved by increasing the lift or decreasing the drag. Drag can be reduced by reducing the size of the blades, i.e. making "thinner" blades. However, the blades must be strong enough to withstand the mechanical load on the blades. Accordingly, it would be useful to provide a wind turbine which had decreased load on the blades since this would permit use of thinner blades, thus increasing lift-to-drag ratio.

Another factor affecting the operation and economics of wind turbines is variability. The variable nature of wind has, in the past, required devices having sufficient structural strength to withstand the peak loads such as surges in the amount of torque developed (e.g., from wind gusts and the like). Thus, any previous devices required large and strong structures to accommodate, e.g., torque surges, even though, during the majority of the time such large and strong structures are not needed (i.e. during non-gust events). Furthermore, torque surges result in undesirable power surges. Accordingly, it would be useful to provide a wind turbine which can effectively control torque surges and thus reduce the occurrence of power spikes and reduce the need for heavy and strong structures.

Some previous wind turbine designs provided for pivoting or "teetering" of the blade structure (i.e., pivoting of the blades, as a unit) with respect to the axis of rotation, e.g., to accommodate non-uniform wind inflow conditions such as wind sheer. However, some approaches for limiting the amount of teeter motion tend to provide an undesirable amount of stress on parts, sometimes leading to fatigue and/or failure of components. Further, a teetering wind turbine can have instability in low velocity wind conditions or during a high wind velocity restart. Accordingly, it would be useful to provide a wind turbine in which, if blade teetering is used, teetering can be effectively controlled while reducing or eliminating fatigue or failure of components.

An important aspect of many wind turbine devices is the design of the tower on which the rotor and generator device are mounted. Certain previous tower designs, particularly those intended for transportable or mobile installations, permitted pivoting of all or a portion of the tower about a pin or other axis. While useful for some purposes, this design has resulted in a tower which has different stiffness in different directions. Accordingly, it would be useful to provide a tiltable tower structure which can reduce or eliminate the directionally differential stiffness of the tower structure.

SUMMARY OF THE INVENTION

The present invention includes control of some or all of a number of wind turbine components which can lead to increased lift-to-drag ratio, reduction or elimination of power spikes, and reduction or elimination of component failure such as teeter control component failure.

According to one embodiment, the system adjusts the rotor cone angle, e.g., to counter-balance aerodynamic force with centrifugal force. In one embodiment each rotor blade is pivotable at its root end and the cone angle is adjustable, e.g., using hydraulic cylinders. In one embodiment, adjustment of the cone angle is made in response to a measurement of hydraulic pressure in the hydraulic cone angle adjustment cylinders.

In one embodiment, each blade can be rotated substantially along its longitudinal axis, e.g., in response to movement of a hydraulic cylinder, lead screw, or other adjustment device. In one embodiment, change of the blade pitch is made in response to detection of a flap motion about a blade hinge axis. In one embodiment the pitch is changed in such a way as to reduce or mitigate flapping motion and/or loads.

In one embodiment teeter motion is controlled using a hydraulic system. Preferably, the amount of teeter motion resistance is a function of teeter angular velocity and is not necessarily related to teeter angular displacement. Preferably the maximum resistance to teeter is provided near the center of teeter travel (i.e., at a teeter angle of 0°).

According to one embodiment, a wind turbine tower which is tiltable (e.g., during installation) is configured so that the installed tower is pivotable about at least two different axes, preferably two orthogonal horizontal axes, in a "gimbal" fashion.

BRIEF DESCRIPTION OF THE DRAWINGS

FIG. 6 is a schematic cross-sectional view of a tower base pivot device according to an embodiment of the present invention.

DETAILED DESCRIPTION OF THE PREFERRED EMBODIMENT

Figure 1:
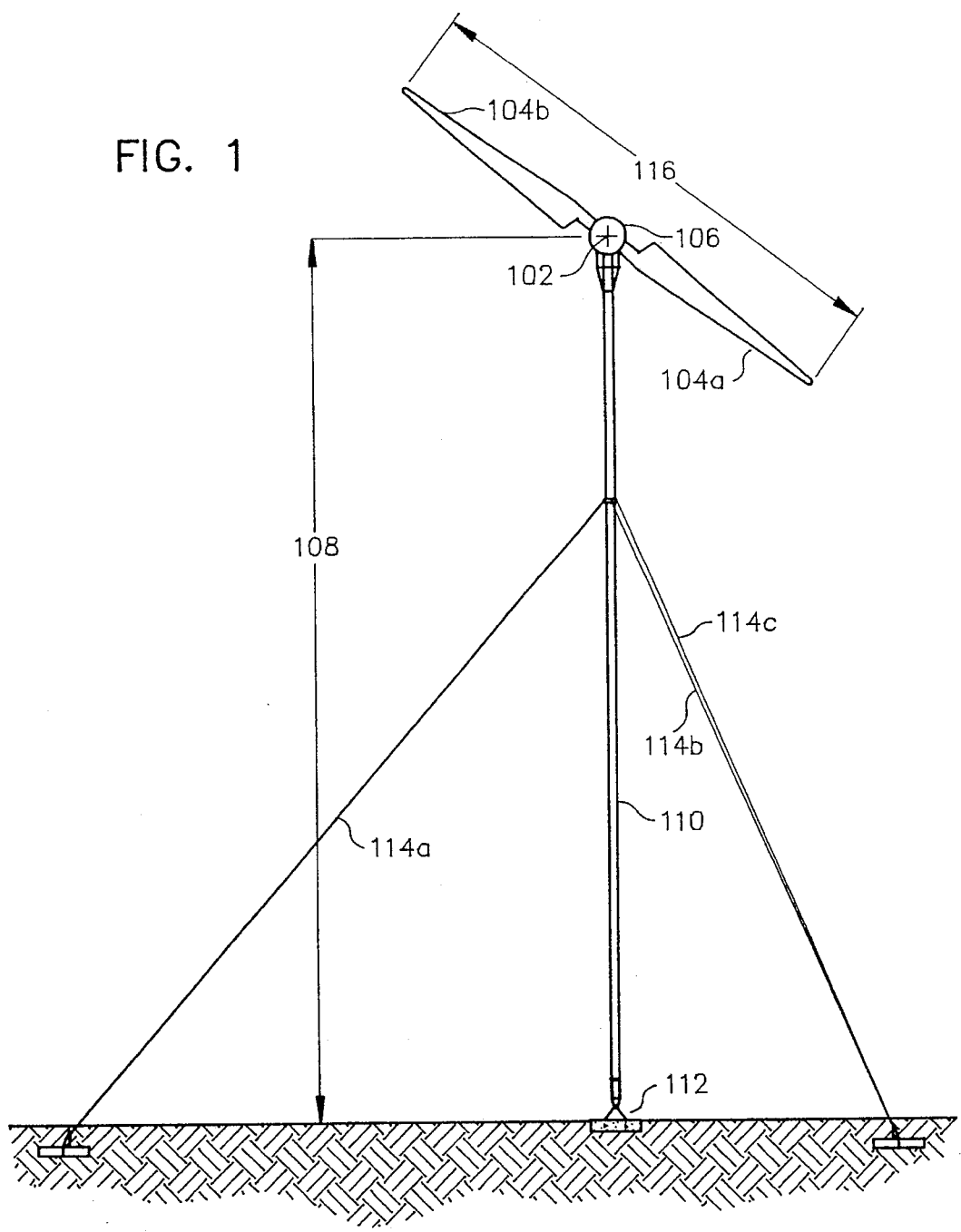
FIG. 1 is a schematic front elevational view of a wind turbine and tower according to an embodiment of the present invention.

The present invention can be applied to many configurations of wind turbines, including a variety of sizes and power ratings. FIG. 1 shows one example of a wind turbine that can be used in connection with the present invention. As depicted in FIG. 1, power is generated by rotation of airfoil-shaped blades 104a 104b about a rotation axis 102, e.g., by transmission of the rotational motion to an electric generator. A number of blade materials can be used, including glass fiber composites. In the depicted embodiment the generator 106 and blades 104a 104b are positioned a distance 108 above the surface of the ground by a tower 110 mounted on a base 112 and positioned, e.g., using guy wires 114a, 114b, 114c. In one embodiment, the rotating blades 104a 104b define a circle having a diameter 116 of about 54 meters. In one embodiment, the height 108 of the tower is about 100 meters.

Figure 2:
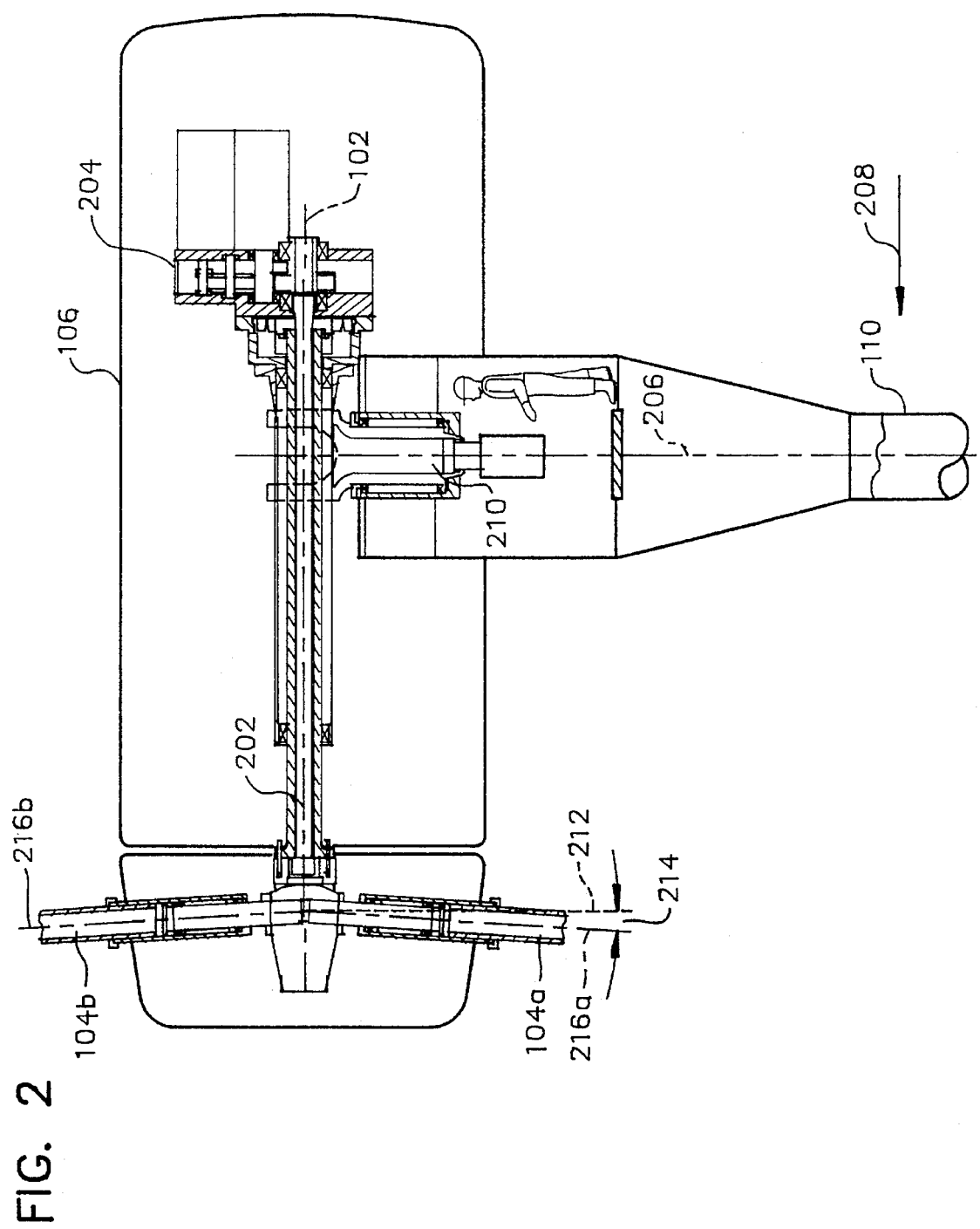
FIG. 2 is a schematic partial cross-sectional view of a blade structure, rotor, and generator for a wind turbine according to an embodiment of the present invention.

As depicted in FIG. 2, rotation of the blades 104a 104b about the rotational axis 102 is transferred, via shaft 202, to an electric generator 204. The low-speed shaft 202 is typically stepped up to a high-speed shaft, using gears, to drive an electric generator at a high rotational speed. The particular configuration depicted in FIG. 2 relates to a downstream device, i.e., a device in which the housing 106 is moved, e.g., by rotation about vertical axis 206 such that the blades 104a 104b, at least during normal operating conditions, are downstream from the tower 110 with respect to the wind direction indicated by arrow 208, such that a given moving air parcel will reach the tower 110 before it reaches a blade 104a 104b. At least some aspects of the invention can also be used in connection with upstream configurations. In the depicted embodiment a spindle 210 can be provided for positioning or maintaining the blades 104a 104b in the desired downstream configuration by rotating the housing 106 about vertical axis 206.

An important factor in the efficiency of a wind turbine 718 relates to the lift-to-drag ratio of the blades. Lift is created by the relative motion of the airfoil-shaped blades with respect to the wind. In general terms, the lift is a force which is perpendicular to the indent wind direction, while the drag is the resistive force in a direction parallel to the incident wind direction. The lift force can be analyzed as having a first component in the plane of rotor rotation 212, and a second component in the (perpendicular) direction of the wind 208. Plane 212 is substantially perpendicular to the axis of rotation 102. The component of lift which lies in the first plane 212 is the component which is capable of producing useful energy (i.e., energy which can be converted into electricity). The downwind component, i.e., the component in direction 208, does not produce useful energy, and the component of the lift force in the downwind direction 208 ultimately becomes absorbed by the wind turbine and tower structure.

One approach to decreasing the amount of energy that is absorbed by the structure and thus wasted is to configure the blades 104a 104b at an angle 214 with respect to the plane 212. This permits the use of centrifugal force as an offset to the component of blade aerodynamic force in direction 108. As can be seen from FIG. 2, the longitudinal axes 216a 216b of the respective blades 104a 104b will sweep out a cone as the blades rotate. The angle 214 defined by this cone, with respect to the plane 212, is referred to as a cone angle.

Several approaches are possible for providing a cone angle 214. In one approach, the angle 214 is fixed so that a constant cone angle is provided (sometimes referred to as "pre-coning"). This, however, provides proper results only for a single constant wind speed, and thus has deficiencies in the common situation where wind speed is variable. Another approach is to provide free pivoting of the blades through a range of angles 214 so that the particular angle 214 achieved will, at any time, be substantially a balance between the centrifugal forces on the blade (tending to move the blade towards the plane 212 hence reduce angle 214) and the aerodynamic lift forces on the blades (tending to increase the angle 214). Although this provides a useful feature that the angle 214 can change as a function of, e.g., wind speed and/or blade rotational velocity, the free-pivoting blade structure typically results in undesired cyclic changes in the angle 214 for an individual blade as it rotates through a complete revolution, (which may involve a rotation rate of, e.g., about 30 revolutions per minute (r.p.m.) or more) since, e.g., the effect of gravity on a blade will change as the blade rotates. In this regard, it is useful to distinguish between undesirable "flapping," i.e., cyclic changes in the angle 214 on a short time scale (such as once per revolution) and desirable changes in the angle 214 over a longer time scale (such as once in a period of about a minute or more, potentially remaining constant for hours in steady wind conditions). Also, it is believed that the free-pivoting blade configuration can result in undesirable yaw (i.e., undesired vaning or pivoting about vertical axis 206, away from the desired downstream configuration), because cyclic changes in the cone angle 214 can change the angle of incidence (i.e., the angle at which the blade effectively meets the fluid stream as the blade rotates).

Another approach to providing some amount of cone angle variation is to provide flexible blades which, rather than pivoting, can bend into or towards an angled configuration (at least over a portion of the length of the blade, such as at its root). Although most blade structures will have some amount of flexibility, when this is provided in an uncontrolled fashion, it essentially results in a short time scale balance between centrifugal force and aerodynamic lift, and thus is subject to many of the same problems discussed above, for a freely-pivoting blade.

Figure 4A:
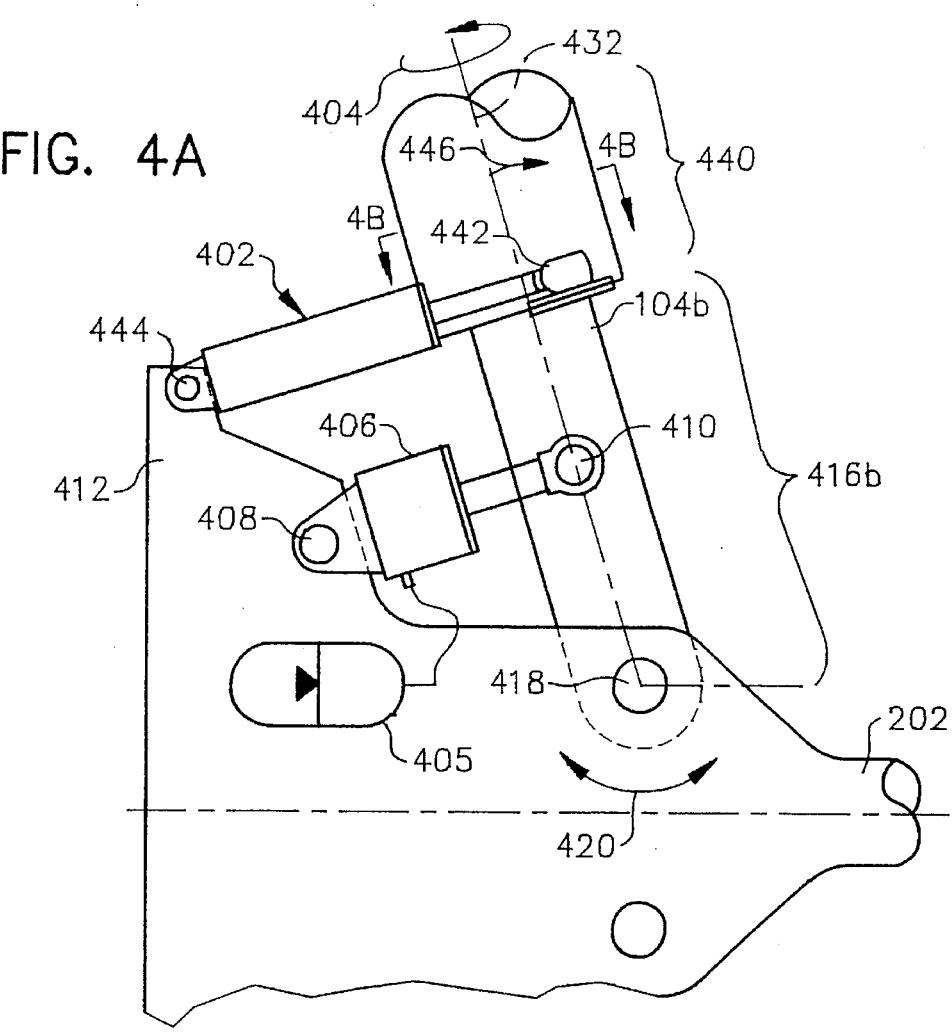
FIG. 4A is a schematic partial side elevation view of a pitch adjustment mechanism according to an embodiment of the present invention.

One configuration for providing an amount of control of coning is to provide a spring-like force on the blade, i.e., provide a force which is proportional to displacement. As depicted in FIG. 4A, a spring-like force can be provided by a pre-charged accumulator 405 in conjunction with a hydraulic cylinder 406, coupled by pivots 408, 410 between a hub 412, attached to the shaft 202, and a lower or root portion of 416b of the blade 104b, which is attached to the shaft 202 about a pivot point 418, so as to permit movement of the blade 104b about the pivot axis 418, in a flap motion direction 420, i.e., toward or away from the plane 212. The spring force could also be provided by other items such as a helical spring or torsion spring or elastic beam.

Although a spring or spring-like member 406 provides some benefit and, in particular, helps to reduce cyclic flapping motion of the blades, in some cases it is believed there will still be a tendency to yaw or otherwise depart from desired tracking. Further, the blades, even with a spring-like control, tend to continue to have a periodic flapping motion, such as flapping once per revolution.

Figure 3A:
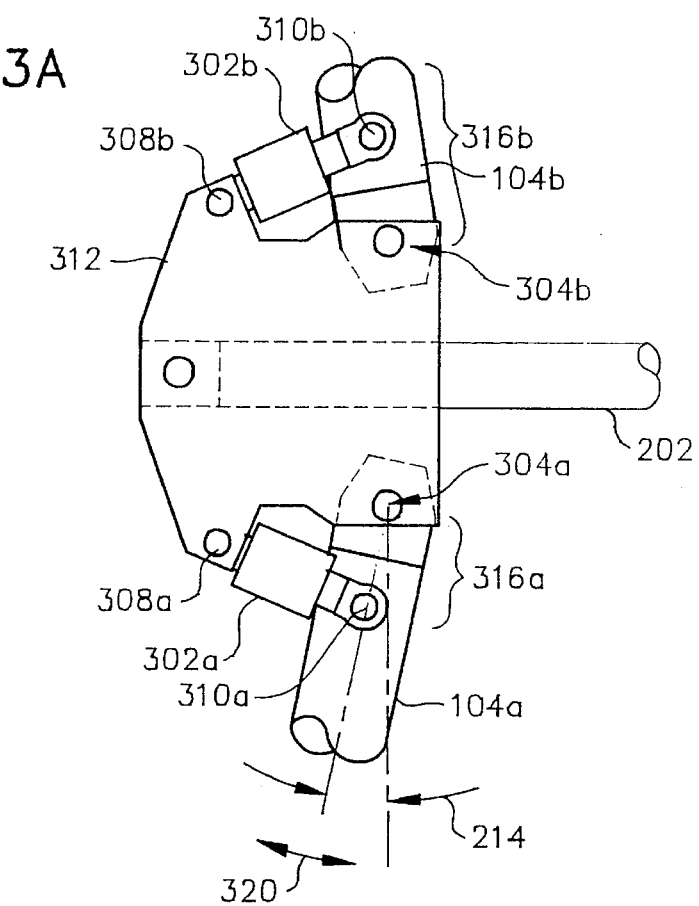
FIG. 3A is a schematic partial side view of a cone angle adjustment device according to an embodiment of the present invention.

The embodiment depicted in FIG. 3A provides a device for controlling flapping, e.g., on a relatively short time scale, such as the period of revolution of the blades. According to the configuration depicted in FIG. 3A, actuators, such as hydraulic cylinders 302a and 302b are attached to the root portion 316a 316b of the blades 104a 104b in a fashion somewhat similar to that depicted for cylinder 406 in FIG. 4A. However, in the embodiment of FIG. 3A, the cylinders 302a and 302b are not passive spring-like devices, but are controllable components such as controllable hydraulic components that may be controlled, e.g., using a control system, such as that described below. The hydraulic cylinders 302a and 302b are controlled to drive or preferably permit movement of the blades 104a 104b to desired cone angles.

The blades 104a 104b are hinged about pivot axes 304a 304b to a hub 312, which rotates with the low-speed shaft 202. Thus, blade 104a can rotate about axis 304a to move in a direction 320, defining a cone angle 214. Cylinders 302a and 302b couple the hub 312 to the blades 104a and 104b, respectively, using pivots 308a, 308b, 310a, 310b. In one embodiment, another pair of cylinders, positioned directly behind cylinders 302a and 303b, in the view of FIG. 3A, and thus not shown, are provided such that a pair of cylinders is used to control cone angle 214 for each blade 104a and 104b.

In one embodiment, the cylinders 302a and 302b are controlled so as to permit the blades 104a and 104b to move to a cone angle which decreases (compared to some other cone angle configurations) the amount of energy that must be absorbed by the blades, and/or to limit peak flap moment loads. The flap moment load can be defined as the component of lift in direction 208, which is perpendicular to the blade longitudinal axis, times distance measured along the blade longitudinal axis, from the rotational axis plus the component of centrifugal force times distance measured along the blade axis from the rotational axis. According to one embodiment of the present invention, information about the current stroke position of each cylinder is obtained, such as by monitoring with a linear transducer. Also, information about the pressure in the hydraulic cylinders is obtained, such as by using pressure transducers. A servo-valve can be used to relieve and supply hydraulic fluid from and to the cylinders and, preferably, the servo-valve permits adjustment of the cone angle 214 in response to information regarding the pressure in the hydraulic cylinders. In general, a high mount of pressure in one end of the cylinders indicates an undesirably high flap moment. In response to detection of an undesirably high flap moment, the cylinders 302a 302b are used to controllably permit the blades 104a 104b to move to a new cone angle, decreasing the flap moment and thus the load on the blades. Preferably, the cylinders 302a, 302b are controlled so as to allow the blades to move toward the cone angle that the current wind load (or, more precisely, the current balance between aerodynamic force and centrifugal force) is pushing the blades toward but in a controlled fashion, preferably in steps or increments, such as in increments of about one degree. Preferably, after a step or incremental change in cone angle has been permitted, the cone angle will be held substantially constant for a minimum period of time (such as about 3 blade revolutions or more) before the system will allow another incremental change in cone angle.

In one embodiment, the system is configured to avoid excessive flap movement or thrashing. The system can be configured to change the cone angle only when the pressure in a cylinder reaches a pre-defined setpoint, rather than in response to any change in pressure, no matter how small. Further, the system can be configured to consider pressure averaged over a period of time, such as pressure averaged over, e.g., three revolutions of a blade. If desired, the system can be configured to quickly move the blades to stop configuration, such as the configuration with the blades substantially parallel to plane 212 (e.g., in an "emergency stop" situation).

Preferably, the system is configured to limit the range of the cone angle. The amount of the cone angle is preferably limited to the range of zero degrees to about 18 degrees, more preferably between about zero degrees and about 16 degrees, and even more preferably between about zero degrees and about 15 degrees.

According to one embodiment of the invention, the blades 104a and 104b are provided in a size which is thinner than would be necessary if the peak flap moment were not controlled as described herein, such that drag is reduced and lift-to-drag ratio is increased compared to devices which do not control peak flap moment loads. It is believed that, in some configurations, it would be possible to reliably and economically convert up to 51% to 52% (or more) of kinetic wind energy to mechanical (rotation) energy for, e.g., electrical generation.

Although the embodiment of FIG. 3A depicts hydraulic cylinders used for driving the blades 712 to a desired cone angle, other devices could be used such as lead screw devices 714, linear motors 716, and the like.

Figure 3B:
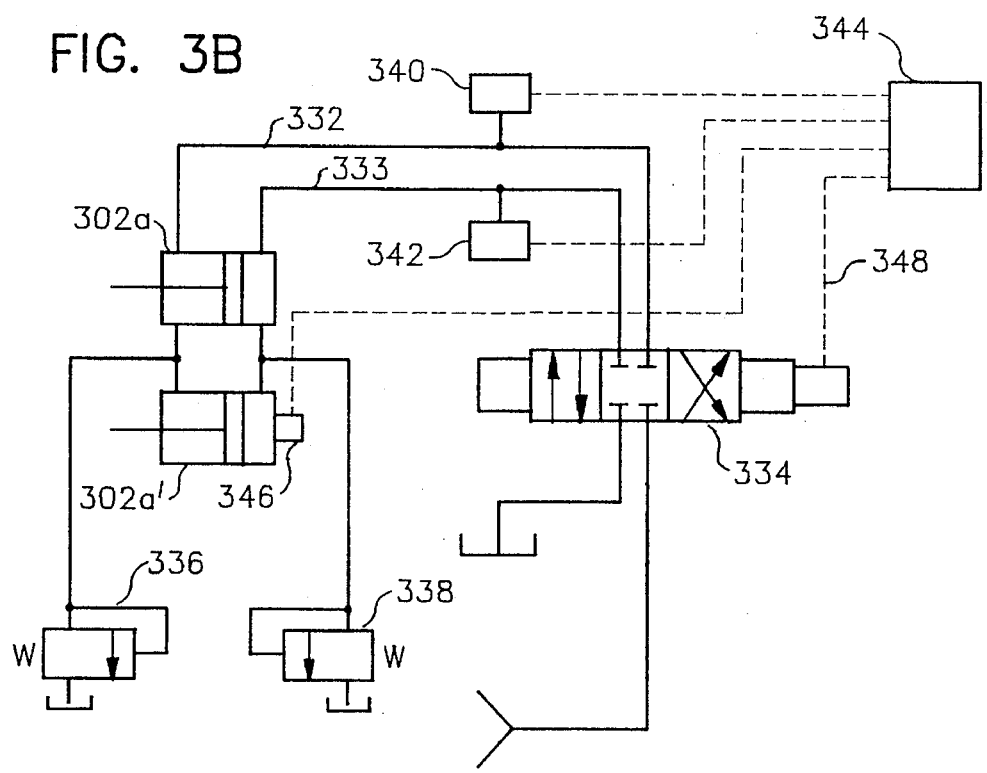
FIG. 3B is a schematic diagram of a hydraulic circuit for cone angle adjustment according to an embodiment of the present invention.

FIG. 3B depicts one possible system for a hydraulic circuit which can be used to control a cone angle. In the embodiment of FIG. 3B, the cylinders 302a, 302a', are coupled by hydraulic lines 332, 333, to a servo-valve 334 (electrical hydraulic valve). A number of hydraulic cylinders can be used for this purpose, including those available under the trade name Accumaster, from Rexroth Corporation of Lexington, Ky. Lines 332, 333 are coupled to pressure relief valves 336, 338. Pressure transducers 340 and 342 provide information regarding the pressure in the hydraulic cylinders to a controller such as an electronic controller, like a programmable logic controller (PLC) 344. PLC 344 also receives information regarding the linear displacement of hydraulic cylinder 302a, e.g., from a linear displacement transducer 346. The PLC is programmed to receive information about the pressure in the cylinders 302a, 302a' and determine if the pressure in the cylinders (preferably a time-averaged pressure) is indicative of an undesirably high peak flap moment. Preferably, if the average pressure exceeds a setpoint (which may be a variable setpoint, as a function of the current cone angle, detected by the linear displacement transducer 346), the PLC will calculate a new cone angle that the blades should be permitted to move to (the "command cone angle") and will output a command over line 348 to the servo-valve 344, instructing the servo-valve to relieve fluid from the high pressure side of the cylinder and feed fluid to the low pressure side until the command cone angle is reached (as detected by transducer 346) thus allowing the blade attached to the hydraulic cylinders (as described in FIG. 3A), to move in a direction so as to reduce the flap moment load.

The embodiment of FIG. 3B shows a system for controlling a single blade of a wind turbine. In one embodiment, each blade of the wind turbine would have its own control system as depicted in FIG. 3B and thus, in a two-blade system, there would be two control systems as shown in FIG. 3B. In such a system where each blade has its own independent control system, it may be possible to provide only a single PLC 344 to be used for controlling the two independent systems.

In another configuration, the control for the blades of the wind turbine system can be configured in a master and slave relationship, i.e., such that only one blade has a complete control system as depicted in FIG. 3B and the other blades will be slave blades which will be controlled so as to move the slave blades to a cone angle substantially the same as the cone angle of the master blade. In this configuration, the master blade will have a control system as depicted in FIG. 3B while each of the slave blades will have a system which is similar to that depicted in FIG. 3B but does not have pressure sensors at the ends of the cylinders 302a, 302a'. In the master/slave system, when the master control system detects a pressure in one of the cylinder ends greater than a setpoint pressure, this information is conveyed to the PLC 344 which then controls the servo-valve 344 for each of the slave blades as well as the master blade so as to move the blades of the wind turbine towards the command cone angle calculated for the master blade.

In a configuration in which each blade 712a, 712b has its own independent control system (possibly sharing a PLC 344) it is preferred to configure the system to avoid having blades which are at cone angles that are different from each other by more than a certain amount. If blades are at very different cone angles, the effective center of mass with respect to the rotational axis is different for the different blades leading to rotor or system imbalance. The amount of imbalance that can be tolerated will be a function of the particular configuration and of rotational speed of the apparatus. In one embodiment, the PLCs, if there are more than one, can communicate with each other to prevent the difference in cone angle of the various blades from exceeding a predetermined difference.

In a master/slave configuration one potential difficulty is that in turbulent conditions the blades may be subject to different aerodynamic forces. Thus, it is possible that at the point in time when the master blade is subject to forces indicating that the blade should be allowed to, e.g., increase its cone angle, it is possible that one or more of the slave blades may, owing to turbulence, wind shear, etc., be in a configuration in which the balance of aerodynamic force and centrifugal force will tend to decrease rather than increase the cone angle for that blade. Thus, in a master/slave configuration, it may be useful to provide cylinders which can not only permit the blades to move to a new cone angle but which have the capability of actively driving blades to a new cone angle.

In summary, according to the embodiment of FIG. 3A and 3B, the system adjusts the rotor cone angle to more effectively counterbalance aerodynamic force with centrifugal force on rotor blades while avoiding undesirable flapping. The result is reduced structure-borne flap moment loads on the blades and rotor. Each rotor blade includes a hinge at its root end, where the hinge can be any of a number of types, including a pin-and-bearing type, or a flexible elastic type. In the depicted embodiment, hydraulic cylinders connected between the inner extremity of each blade and the rotor hub, are coupled to transducers which measure the stroke position of each hydraulic cylinder, and transducers which measure the hydraulic pressure. The stroke position of the hydraulic cylinders determines what the rotor cone angle will be. The hydraulic pressure is a direct indication of the flap moment of the blades. A control system, such as that depicted in FIG. 3B, responds to the hydraulic pressure signal from the hydraulic pressure transducers 722 and adjusts stroke position of the hydraulic cylinders. Adjustment in the stroke position results in cone angle change and a new balance of aerodynamic and centrifugal forces. Preferably, relief valves limit hydraulic pressure to predetermined limits, and also act as safety overload limiters. The system reduces blade flap moment loads in at least two ways: (1) adjusting the rotor cone angle according to wind speed, thereby more effectively balancing aerodynamic forces against centrifugal forces when compared with other designs, such as those having a fixed cone angle; and (2) limiting wind-gust induced flap-moment surges with hydraulic pressure relief. The blade flap-moment attenuation system employs flap hinges and stroke position-controlled hydraulic cylinders 724a, 724b to establish cone angle and react to flap-moment loads. It is believed that this system will effectively reduce blade flap-moment loads, particularly when compared with a fixed cone angle design. In one embodiment, the hydraulic system rotates on the rotor. Electrical power and control signals are transferred across the rotating boundary, e.g., by slip rings. Accumulators provide reserve hydraulic power and, preferably, all systems employ 100% redundancy.

One of the difficulties that a wind turbine device must address is the variability of the wind. The wind can change in speed and direction over very short time periods. In the case of a sudden increase in wind velocity or "gust," the amount of torque applied to the rotor will increase very rapidly or surge. Such a torque surge results in a sudden surge in power generated. Such power surges are undesirable in most situations. Furthermore, the torque surge places a high load on the structural components of the wind turbine, including the blades and rotor, and thus many wind turbine devices need to be constructed of materials which are heavy and sturdy enough to withstand such torque surges.

Figure 4B:
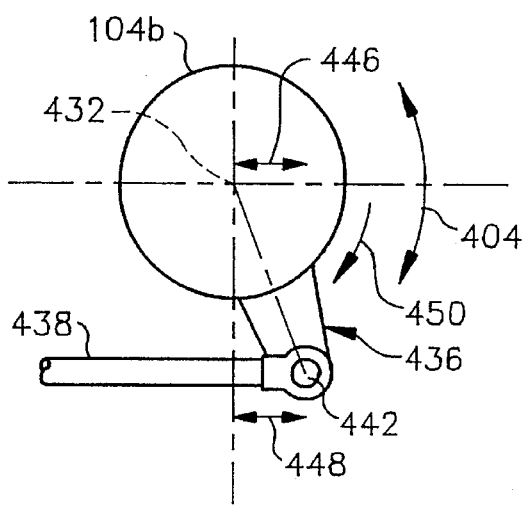
FIG. 4B is a partial cross-section of view taken along line 4B—4B of FIG. 4A.

The embodiment depicted in FIGS. 4A and 4B provides a device for mitigating torque surges by changing the pitch of the blades, preferably in response to a sudden change in wind conditions, such as a gust. One approach to mitigating torque surge is to change the pitch of the blades (i.e., the orientation of the blade about its longitudinal axis 432), by rotating the blade 104b to induce a pitch motion 404. In one embodiment, the pitch motion 404 is provided in response to flap motion 420 of the blade 104b. FIG. 4B depicts a crank attachment 436, which achieves this pitch motion 404. The crank attachment 436 is pivotally attached by a crank arm 438, to the hub 412. The blade 104b is configured in two portions, an upper portion 440, and a lower portion 416b. The upper portion 440 is rotatably coupled to the lower portion 416b, so that it can rotate 404 about axis 432 with respect to the lower portion 416b. A number of rotatable couplings can be used, including rolling element bearings or sliding type bearings. In the depicted embodiment, as the blade 104b undergoes a flap motion 420, the axis 432 will pivot about the pivot axis 418. However, the crank arm 438 prevents the crank pivot 442 from moving with the axis 432 (because the arm 438 ties, or at least couples, the crank pivot 442 to the hub 412 at pivot point 444). Although it would be possible to provide a rigid non-extendable arm 438 between points 444 and 442 in order to cause the pitch motion 404, in the depicted embodiment, the crank arm 438 is made at least partially extendable by providing a pitch cylinder 402. The pitch cylinder prevents the crank pivot 442 from moving freely with the movement of the axis 432. Thus, as the axis 432 pivots as part of the flap motion 420, e.g., in direction 446, the crank pivot 442 cannot move correspondingly, but is at least partially restrained. This causes a force on the crank pivot 442 in direction 448, transferring a rotational force 450 to the crank attachment 436 in causing the upper portion 440 of the blade 104B to rotate 404 about the longitudinal axis 432. Although a hydraulic cylinder 402 is depicted as FIGS. 4A and 4B, other attachment mechanisms can be used, such as a lead screw mechanism, a linear motor, etc. Preferably, the attachment mechanism effectively averages a flap motion 420 so that the pitch motion 404 imparted to the blade is in response to averaged flap motion 420, such as an average over one or more rotational periods of the blade. This is useful to prevent a "hunting" or thrashing pitch motion, which can occur on an undesirably short time scale.

A number of factors affect the coupling ratio between flap motion and pitch motion, i.e., the ratio of degrees of flap motion 420 to degrees of resultant pitch motion 404. A ratio of 1:1 would mean that for each one degree of flap motion 420, there is a resultant one degree change in pitch motion 404. The direction of pitch motion 404 is the direction which will result in mitigating flapping motion load. In the depicted embodiment, when the flap motion is in a direction towards plane 212, the pitch motion will be clockwise in the view of FIG. 4B. A number of coupling ratios can be used. A given coupling ratio can be achieved by the characteristics of the cylinder 402 or other coupling device, the distance of coupling pivot 442 from the blade root pivot 418, and the distance of crank pivot 442 from the axis of rotation 432. In some embodiments of the invention, the coupling ratio is between about 0.5 and 2, preferably between about 0.7 and 1.5, more preferably between about 0.8 and 1.2. The amount of pitch that can be imparted will depend on the particular installation. In one embodiment, a pitch in the range of between about zero degrees and about 20 degrees, preferably between about zero degrees and 15 degrees can be provided. In one embodiment, the blade pitch can be changed to about 90 degrees (i.e. with blade leading edges facing the wind, e.g. for high wind velocity stop or other stop conditions, or for start-up procedures.)

The change in pitch motion as a result of flap motion such as that depicted in FIGS. 4A and 4B mitigates the flapping moment load and permits use of thinner blades, thus increasing lift to drag ratio. Mitigation of flap moment loads also permits reduction in size of other components, such as bearings. By providing the capability to change pitch in response to sudden wind changes and conditions, such as gusts, torque surges are reduced and power surges are consequently reduced. By providing a capability of averaging, hunting or thrashing of pitch changes are mitigated.

In summary, the embodiment of FIGS. 4A and 4B provide that extreme excursions in rotor thrust, rotor torque, and blade flap moment, are mitigated by inducing a change in blade pitch, when a blade flap motion occurs. In the depicted embodiment, each rotor blade includes a hinge at its root end (e.g., of a pin-and-bearing type, or a flexible elastic type). Each rotor blade is supported on bearings and thus is rotatable about its longitudinal axis. Blade rotation about the longitudinal axis constitutes a pitch change, which alters the angle of attack with the incident wind, and thus changes aerodynamic lift on the blade. A crank lever is fixed to each blade near its base. For each blade, a hydraulic cylinder, lead screw or other extendable device, is attached at one end to the rotor hub, and at the other end to the crank lever at the base of the blade. The geometry of the assembly is such that a change of blade pitch results when a flap motion about a blade hinge occurs. This change of blade pitch changes the aerodynamic angle of attack of the blade, and thereby mitigates thrust, torque and flap moment loads.

Figure 5A:
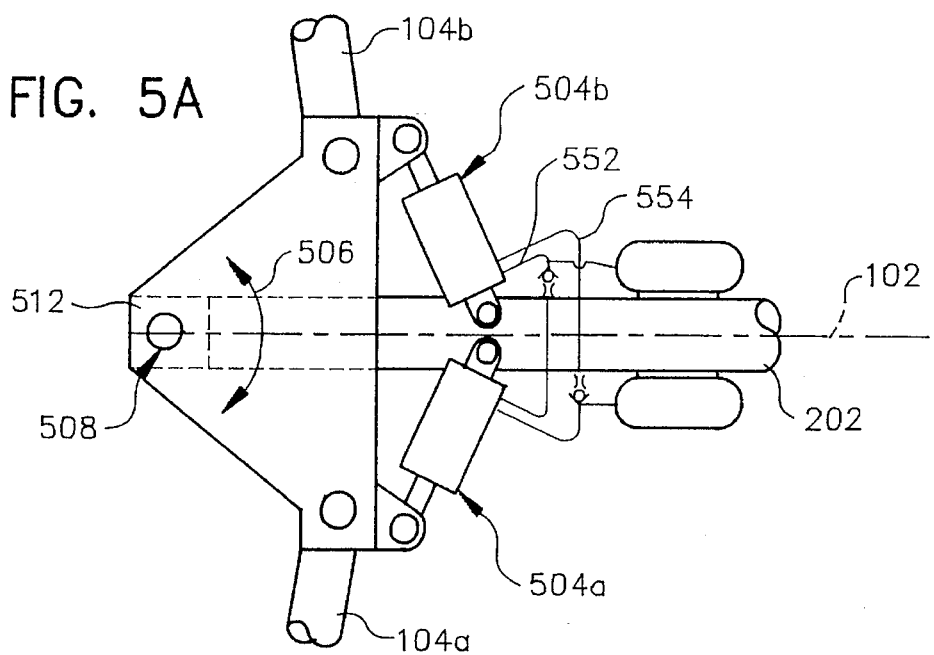
FIG. 5A is a schematic partial side view of a teeter control mechanism according to an embodiment of the present invention.

Another difficulty that wind turbines must accommodate is the spatial variability of wind (i.e., the fact that wind has different velocities at different locations). In particular, when the wind has different velocities at different heights, the phenomenon is referred to as wind shear. When there is an amount of vertical wind shear, a blade will experience fluctuations in incident wind velocity, and thus load, as the blade rotates from a lower position to an upper position. This provides a load on the blade which must be absorbed by the blade, and thus contributes to the need for a large blade structure in many devices. The load which results from vertical wind shear can be at least partially mitigated by providing for teetering of the blades, i.e., pivoting of both blades (as a unit), usually about an axis perpendicular to the axis of rotation. In one manner of teetering, as depicted in FIG. 5A, the blades 104a and 104b are permitted to pivot or teeter 506, as a unit, about a pivot point 508, by providing a hinge or pivot coupling between the hub 512 and the load speed shaft 202, such as a pin-and-bearing pivot, flexible or elastic pivot, or the like.

Although teetering is useful in reducing or eliminating cyclic load, which results from wind shear, teetering can also produce undesirable consequences. One consequence is the potential for developing negative lift and/or instability in low wind velocity conditions. When the wind turbine is exposed to low-wind conditions (e.g., around 3.5 meters per second), it often has poor directional tracking which, combined with rapid changes in wind direction (often associated with low wind velocity conditions) can produce a sudden large difference between the orientation of the wind turbine and the wind direction, such as a difference of up to 50 to 60 degrees or more. In these conditions, the amount of teeter can be extremely large, sometimes to the point of providing a negative angle of attack and thus producing negative lift. In these situations, the aerodynamic force and the centrifugal force will be in the same direction, and thus can lead to extreme flap moment loads, eventually leading to blade structural failure.

Another difficulty associated with providing teeter, is the characteristics of devices which are provided to limit teeter (e.g., to avoid excessive teetering which can lead to, e.g., tower strikes). Teetering can be limited by, e.g., mechanical stops, which provides a displacement-based limit on teeter motion. Teeter can also be controlled using passive restraints such as rubber stops or springs. Stops or springs, however, constrain motion when the teeter reaches a predetermined maximum teeter angle. Without wishing to be bound by any theory, it is believed better to provide constraints when the teeter angle is at or near zero degrees (i.e., the cone defined by the blades 104a and 104b is colinear with the rotation axis 102). Spring or rubber stops or other mechanical stops also suffer from the deficiency that they typically receive extremely high mechanical loads, often leading to fatigue, cracking, and/or failure of parts.

Another situation in which unrestrained teetering can be problematic is when it is desired to begin rotor motion in high wind velocity conditions, such as in a high wind restart condition. In this situation, the angle of attack can be much larger than the design or normal angle, thus also leading to extremes of teeter displacement amplitude.

Accordingly, in the embodiment depicted in FIG. 5A, teeter control is provided by first and second hydraulic cylinders 504a 504b which, in this configuration, are coupled between the low-speed shaft 202 and the inner extremity of each blade, such as the inner extremity of the teetering hub 512, to which the blades are attached. In one embodiment, the hydraulic cylinders 504a and 504b are configured to apply constraints on teetering, preferably near the time that the teetering angle is about zero degrees. This can be achieved, for example, by connecting the cylinders by a hydraulic line having a fixed orifice to control the rate of flow of hydraulic fluid between the two hydraulic cylinders. The flow of hydraulic fluid results from teeter motion, and the controlled flow rate of the hydraulic fluid will control the teeter angular velocity. Thus, in this configuration, the control that is provided is a control of teeter angular velocity, rather than being based on angular displacement.

In the embodiment depicted in FIG. 5A, the two cylinders are coupled by two different hydraulic lines 552, 554, each of which provides for controlled flow in a different direction. The system can be configured so as to be controllable (e.g., so that the orifices in the hydraulic lines have a controllable size). In one embodiment, the flow control orifice valves can be adjusted according to wind velocity, thus teeter can be controlled as a function of wind velocity. Preferably, teetering is controlled and/or limited as a function of teeter angular velocity.

Figure 5B:
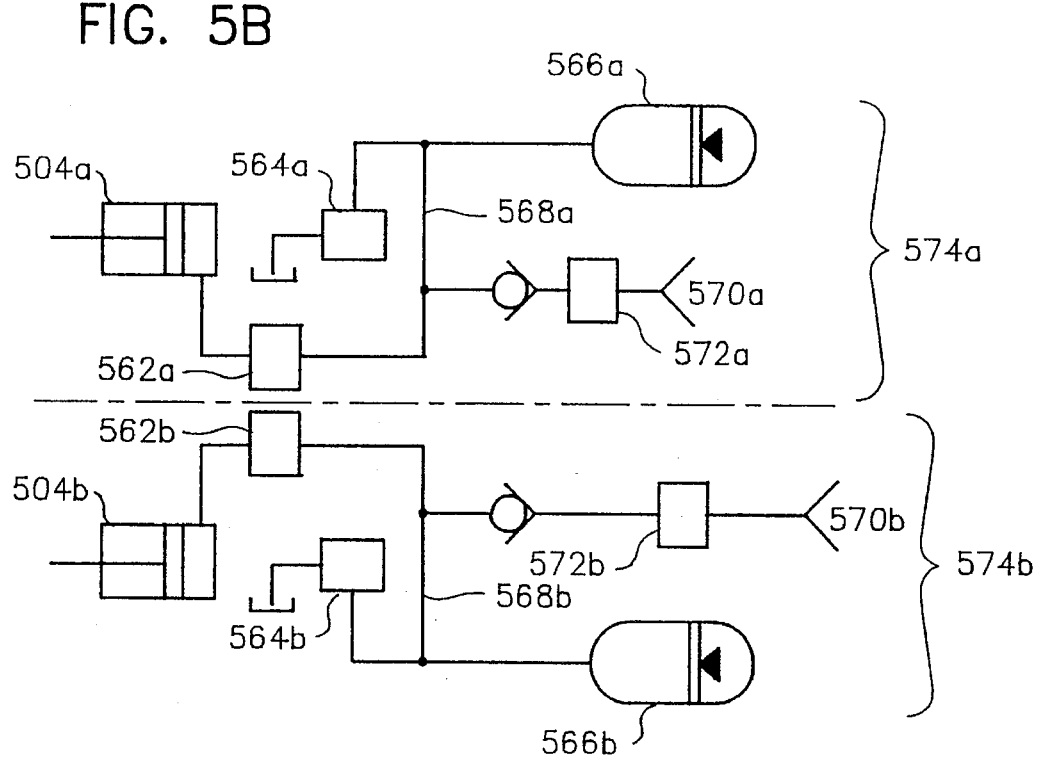
FIG. 5B is a schematic depiction of a hydraulic system for teeter motion control according to an embodiment of the present invention.
Figure 7A:
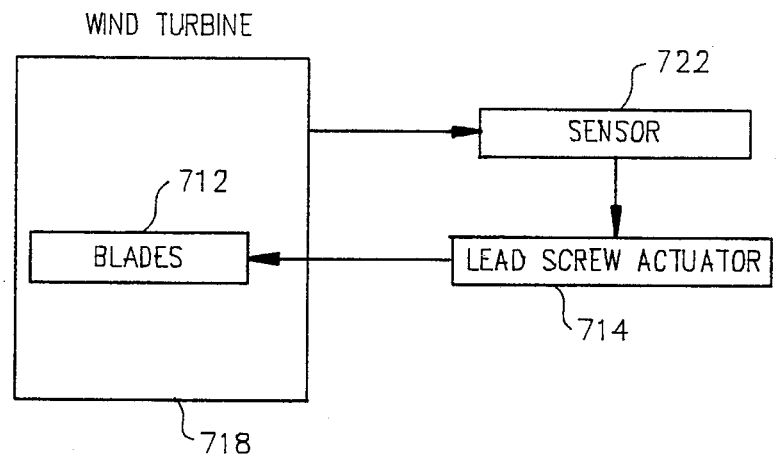
FIGS. 7A–7C are block diagrams depicting wind turbines and actuator configurations according to embodiments of the present invention.
Figure 7B:
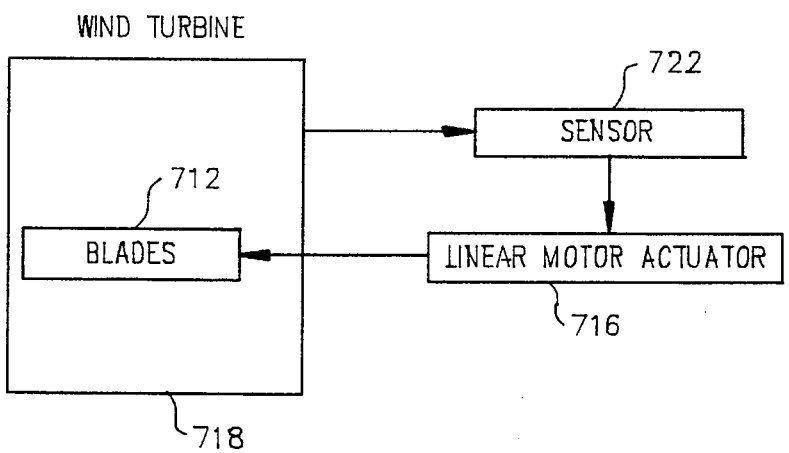
Figure 7C:
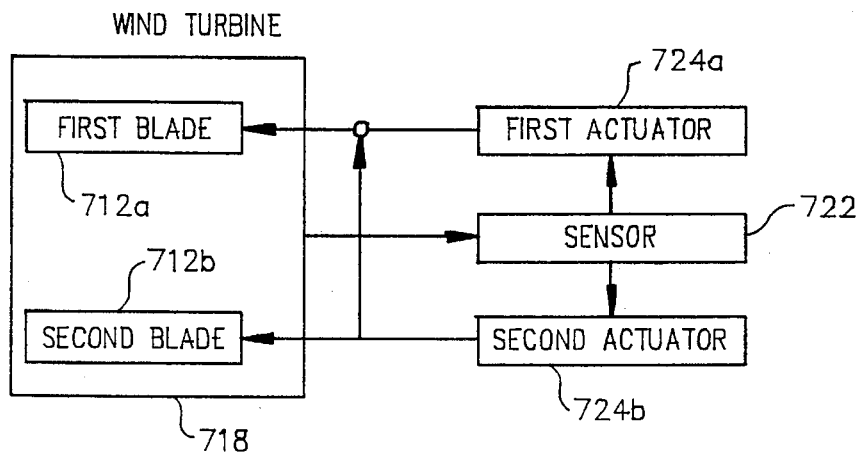

FIG. 5B depicts an embodiment in which a hydraulic system is used for teeter motion control and/or limitation using hydraulic cylinders acting on accumulators, such as nitrogen pre-charged accumulators. Preferably, the system is configured to provide teeter restraint based on angular velocity rather than angular displacement. Preferably, the resistance to teetering is varied or controlled, in one embodiment, by providing flow control valves, i.e., variable orifice valves. This can be achieved, in part by including electronic control of variable orifice valves. In one embodiment, it is also preferable to provide the option to "center" the teetering hub, i.e., to move the system to a zero teeter angle. For example, this feature may be used during a start condition, such as a high wind start condition. The system can provide variable resistance to teetering such as high resistance at start-up (e.g. after the teetering hub is centered) and lower resistance as blade rotational velocity increases, in one embodiment achieving substantially free teetering, within a limited teeter angle range, during normal operation.

In the embodiment depicted in FIG. 5B, cylinders 504a and 504b are coupled, respectively, to flow control valves 562a and 562b. The pre-charged accumulators 566a and 566b can be used to center the rotor by increasing the system pressure. Relief valves 564a and 564b, and accumulators with pre-charge 566a and 566b, provide pressure relief and makeup fluid volume where required. The hydraulic fines 568a, 568b, are coupled to constant pressure hydraulic fluid supplies, 570a, 570b, via pressure reducing valves 572a, 572b. In this embodiment there is no crossflow between the blade number one system 574a, and the blade number two system 574b. If it is desired to combine the centering function of FIG. 5B with the teeter control of FIG. 5A, controllable cross-flow between the systems 574a, 574b can be provided. Preferably, it is possible to control the valves 564a and 564b such that, during normal operation, the amount of resistance to teeter angle is reduced as the velocity of the wind increases. Relief valves 564a and 564b are used to depressurize the system to reduce resistance to teeter angle changes for normal (e.g. substantially free-teetering) operation. These valves are controlled by an electronic control such as a programmable logic controller, preferably in response to detection of a system parameter such as teeter angular velocity or another parameter, such as wind velocity or acceleration.

In summary, the embodiments of FIGS. 5A and 5B provide for control of teeter motion. Teeter motion control is used to avoid interferences with support structure or otherwise excessively large excursions of motion. Mechanical stops used to limit angular displacement such as springs or cushions are subject to high stress and failure and limit displacement, rather than angular velocity. The depicted embodiments provide teeter motion control by limiting angular velocity instead of angular displacement. This eliminates impact loadings that occur with mechanical stops. In one embodiment a two-blade wind turbine rotor with hinge connections to the low speed shaft are provided with two or more hydraulic cylinders for each blade, each hydraulic cylinder connected between the low speed shaft and the inner extremity of each blade. The inner connection of the hydraulic cylinders is such that the teeter motion of the rotor induces a flow of hydraulic fluid between cylinders. Control of the flow rate between cylinders will control the teeter angular velocity. Orifice valves or other flow controlling valves located in the interconnection passages between cylinders are used to control flow rates. The teetering hub can be centered, e.g. for start-up, and teeter resistance can be controlled e.g. as a function of wind speed. Accumulators and check valves located in the inter-connection between cylinders provide makeup fluid as required. The orifice valves can be either fixed or variable, such as a variable flow control valve controlled by an electronic signal.

As noted above, most wind turbine installations involve providing an elevating structure or tower 110. A number of construction techniques and materials can be used. In some cases, particularly where the tower is mobile, the tower is raised into position by hinging the base of the tower, such as using a pin and journal mechanism, and pivoting the tower upward to the vertical position about the hinge. One difficulty with this technique is that the resulting tower has a different stiffness in different directions. In particular, it is not possible to fully restrain moments (but only displacement) at the base of the tower in a plane which is perpendicular to the pin axis. That is, parallel to the pin axis, the tower will be stiff, while perpendicular to the pin axis there will be less stiffness. As a result, the dynamic response of the tower will depend on the wind direction. This can result in a concentration of stress on the pin area and eventual fatigue and failure.

In the embodiment depicted in FIG. 6, the base 610 of the tower 110, is coupled to a base structure 612 by a first pin to permit the tower 110 to be rotated upward in direction 614, about the axis defined by the first pin 616, e.g., during initial installation or construction of the tower. However, according to the embodiment of FIG. 6, a second pin, 618, is provided, preferably at right angles to the first pin, 616, to couple the tower to the base of structure, to provide a gimbal- or cardan-type joint. This provides the tower base with two axes for bending. The design provides freedom of bending in all directions. The structural bending stiffness is substantially identical for any wind direction.

In light of the above description, a number of advantages of the present invention can be seen. The present invention provides for increased lift-to-drag ratio, and thus increased power output, e.g., by permitting the reduction in sector size of the blades and/or other components. By controlling cone angle in an active manner, by controlling pitch angle, preferably as a function of flap motion, and by controlling teeter, preferably as a function of angular velocity, extreme loads, impacts and excursions can be limited to make it impossible to provide smaller, lighter weight blades and other components resulting in a high lift-to-drag ratio, reduced fatigue, reduced maintenance and replacement, increased life, reduction of power excursions and torque surges, and increased efficiency.

A number of variations and modifications of the present invention can also be used. Although a two-blade turbine has been illustrated, at least the cone angle adjustment and pitch adjustment aspects of the invention, and tower gimbaling aspect, can be used in connection with turbines having three or more blades. Although the figures illustrate a downstream turbine, upstream wind turbines can also be used in connection with the present invention. The present invention can be used in connection with a variety of sizes and output capacities of wind turbines. Although the present invention has been described principally in connection with hydraulic controls and other devices, additional types of controls and devices can be used, including mechanical, electro-mechanical, pneumatic, computer controlled devices, and the like.

Although one embodiment uses pairs of cylinders for controlling pitch angle of each blade, it is possible to use three or more cylinders per blade, one cylinder per blade or one cylinder for all blades. It is possible to use some aspects of the invention without using other aspects, e.g. it is possible to provide cone angle control, as described, without providing teeter angle control. However, it is currently believed that increased benefit is derived by using several or all aspects of the invention since many or all aspects of the invention work in coordination with one another. For example, pitch angle can be controlled as a function of cone angle at the same time that cone angle is controlled as a function of flap moment.

According to one embodiment, the present invention provides, in a wind turbine having a plurality of blades, each having a longitudinal axis, the blades being rotatable about an axis of rotation, so as to be inclined to said axis or rotation, defining a cone angle for each blade, apparatus comprising at least a first actuator coupled to at least a first of said blades so as to controllably change said cone angle of at least said first blade; and a sensor which senses at least a first operating parameter of said wind turbine; wherein said first actuator controls changes of said cone angle of at least said first blade in response to the value of said first operating parameter sensed by said sensor. In one embodiment, the first operating parameter is selected from the group consisting of wind speed, blade flexure, blade strain and power output change. In one embodiment, there is further provided at least a second actuator coupled to at least a second of said blades so as to controllably change said cone angle of said second blade; wherein both said first actuator and said second actuator control changes in said cone angle of said first blade and said second actuator controls changes in said cone angle of said second blade in response to the value of said first operating parameter sensed by said sensor, so as to provide a cone angle of said second blade which is substantially equal to a cone angle of said first blade.

Although the invention has been described by way of a preferred embodiment and certain variations and modifications, other variations and modifications can also be used, the invention being; defined by the following claims.

What is claimed is:

1. In a wind turbine having a plurality of blades each having a longitudinal axis, the blades being rotatable about an axis of rotation, so as to be inclined to said axis of rotation, defining a cone angle for each blade, apparatus comprising:

at least a first actuator coupled to at least a first of said blades so as to controllably change said cone angle of at least said first blade;

a sensor which senses at least a first operating parameter of said wind turbine;

wherein said first actuator controls changes of said cone angle of at least said first blade in response to the value of said first operating parameter sensed by said sensor.

2. Apparatus as claimed in claim 1 wherein said first actuator permits only incremental changes in cone angle.

3. Apparatus as claimed in claim 1 wherein said first actuator permits changes in cone angle only when said first operating parameter has changed by a first amount.

4. Apparatus as claimed in claim 1 wherein said first operating parameter is averaged over a first time period.

5. Apparatus, as claimed in claim 1, wherein said first operating parameter provides an indication of blade flap moment.

6. Apparatus, as claimed in claim 1, wherein said first operating parameter is selected from the group consisting of wind speed, blade flexure, blade strain, and power output change.

7. Apparatus, as claimed in claim 1, wherein said first actuator comprises a hydraulic cylinder coupling a root portion of said first blade to a point which is fixed relative to said axis of rotation.

8. Apparatus, as claimed in claim 7, wherein said sensor senses hydraulic pressure in said hydraulic cylinder.

9. Apparatus, as claimed in claim 1, wherein said first actuator comprises an actuator selected from the group consisting of a lead screw, a linear motor and a hydraulic cylinder.

10. Apparatus, as claimed in claim 1, further comprising a transducer which indicates the current cone angle of at least said first blade.

11. Apparatus, as claimed in claim 1, further comprising a microprocessor for receiving output from said first sensor and sending a command signal to said actuator to control said cone angle.

12. Apparatus, as claimed in claim 1, wherein said first actuator controllably changes said cone angle in response to a change in a value of said first parameter which is averaged over at least a first time period.

13. Apparatus, as claimed in claim 1, wherein each of said plurality of blades is independently controlled to change the cone angle for said blades in response to the value of said first operating parameter of said wind turbine.

14. Apparatus, as claimed in claim 1, further comprising at least a second actuator coupled to at least a second of said blades so as to controllably change said cone angle of said second blade;

wherein both said first actuator and said second actuator control changes in said cone angle of said first blade and said second actuator controls changes in said cone angle of said second blade in response to the value of said first operating parameter sensed by said sensor, so as to provide a cone angle of said second blade which is substantially equal to a cone angle of said first blade.

* * * * *